US011379744B1

(12) United States Patent
Marino

(10) Patent No.: US 11,379,744 B1
(45) Date of Patent: Jul. 5, 2022

(54) OPTIMIZING NETWORKS OF DECISION NODES

(71) Applicant: NortonLifeLock Inc., Tempe, AZ (US)

(72) Inventor: Daniel Marino, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 1368 days.

(21) Appl. No.: 15/648,736

(22) Filed: Jul. 13, 2017

(51) Int. Cl.
*G06N 5/04* (2006.01)
*G06N 5/02* (2006.01)

(52) U.S. Cl.
CPC .............. *G06N 5/047* (2013.01); *G06N 5/025* (2013.01)

(58) Field of Classification Search
CPC .................................................... G06N 5/047
USPC ............................................................ 706/48
See application file for complete search history.

(56) References Cited

U.S. PATENT DOCUMENTS

| 4,849,905 | A | * | 7/1989 | Loeb | G06N 5/047 706/48 |
| 4,951,225 | A | * | 8/1990 | Lee | G06N 5/047 706/48 |
| 4,956,791 | A | * | 9/1990 | Lee | G06N 5/047 706/48 |
| 5,155,803 | A | * | 10/1992 | Barabash | G06N 5/047 706/48 |
| 5,159,662 | A | * | 10/1992 | Grady | G06N 5/047 706/48 |
| 7,953,779 | B1 | * | 5/2011 | Ragusa | G06F 16/904 707/960 |
| 2014/0033173 | A1 | * | 1/2014 | Frenkiel | G06F 8/74 717/123 |
| 2014/0047545 | A1 | * | 2/2014 | Sidagni | G06F 21/577 726/25 |
| 2014/0245374 | A1 | * | 8/2014 | Deerman | F01D 3/04 726/1 |

OTHER PUBLICATIONS

Michael J. Kearns and Yishay Mansour. 1998. A Fast, Bottom-Up Decision Tree Pruning Algorithm with Near-Optimal Generalization. In Proceedings of the Fifteenth International Conference on Machine Learning (ICML'98). Morgan Kaufmann Publishers Inc., San Francisco, CA, USA, 269-277. (Year: 1998).*
Lee, Ho Soo, and Marshall I. Schor. "Dynamic augmentation of generalized Rete networks for demand-driven matching and rule updatings." Proceedings 6th IEEE Conference on Artificial Intelligence Applications. 1990. (Year: 1990).*

(Continued)

*Primary Examiner* — James D. Rutten

(57) ABSTRACT

A method for optimizing network decision nodes is described. In one embodiment, the method includes generating an initial network of decision nodes constructed according to one or more rules, rearranging one or more decision nodes of the initial network based at least in part on a conversion of the one or more rules to a disjunctive normal form, analyzing the rearranged network of decision nodes in an upstream direction, and optimizing the rearranged network by merging two or more decision nodes of the rearranged network based at least in part on the analysis of the rearranged network. In some cases, the decision nodes include one or more levels of parent nodes and child nodes, each level of child nodes being connected to respective parent nodes. In some cases, the upstream direction is in a direction from the child nodes to the parent nodes.

18 Claims, 11 Drawing Sheets

(56) References Cited

OTHER PUBLICATIONS

E. N. Hanson, S. Bodagala and U. Chadaga, "Trigger condition testing and view maintenance using optimized discrimination networks," in IEEE Transactions on Knowledge and Data Engineering, vol. 14, No. 2, pp. 261-280, Mar.-Apr. 2002, doi: 10.1109/69.991716. (Year: 2002).*

Shell, Peter, and Jaime Carbonell. "Towards a General Framework for Composing Disjunctive and Iterative Macro-operators." Semantic Scholar, https://pdfs.semanticscholar.org/b71a/c51479017b474d668c4058dea1c3294cd274.pdf. Accessed Jul. 12, 2017.

Agrawal, Jagrati, Yanlei Diao, Daniel Gyllstrom, and Neil Immerman. "Efficient Pattern Matching Over Event Streams." Department of Computer Science, University of Massachusetts, Amherst, Jun. 9-12, 2008: https://people.cs.umass.edu/~yanlei/publications/sase-sigmod08.pdf. Accessed Jul. 13, 2017.

Jin, Chun, and Jaime Carbonell. "ARGUS: Rete + DBMS = Efficient Continuous Profile Matching on Large-Volume Data Streams." School of Computer Science, Carnegie Mellon University, Jul. 6, 2004: http://www.cs.cmu.edu/~cjin/publications/Rete.pdf. Accessed Jul. 13, 2017.

* cited by examiner

R1: IF (a or b or c) and (x or y or z) and (j or k) THEN foo
R2: IF (c) and (z) and (k) THEN bar R1: IF (a or b or c) and (x or y or z) and (j or k) THEN foo
R2: IF (c) and (z) and (k) THEN bar

OPTIMIZING NETWORKS OF DECISION NODES

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a method for optimizing network decision nodes is described. In some cases, the method may include performing one or more operations in conjunction with one or more computing devices each that include at least one processor. In one embodiment, the method may include generating an initial network of decision nodes constructed according to one or more rules, rearranging one or more decision nodes of the initial network based at least in part on a conversion of the one or more rules to a disjunctive normal form, analyzing the rearranged network of decision nodes in an upstream direction, and optimizing the rearranged network by merging two or more decision nodes of the rearranged network based at least in part on the analysis of the rearranged network. In some cases, the decision nodes may include one or more levels of parent nodes and child nodes, each level of child nodes being connected to respective parent nodes. In some cases, the upstream direction may be in a direction from the child nodes to the parent nodes.

In some embodiments, the network of decision nodes may include one or more node types. In some cases, the one or more node types may include at least one of a beta action node, a beta join node, an alpha test node, a beta memory node, and an alpha memory node, or any combination thereof. In some embodiment, at least one child node from the network of decision nodes may be connected upstream to two or more parent nodes of the same node type.

In some cases, the method may include identifying, from the analyzing, at least two beta action nodes that perform an identical action and merging the at least two beta action nodes that perform the identical action. In some cases, the method may include identifying, from the analyzing, at least two beta join nodes that perform an identical join test, share identical child nodes, and share identical parent nodes, where the identical parent nodes include either the same alpha memory parent nodes or the same beta join parent nodes. In some cases, the method may include merging the at least two beta join nodes that perform the identical join test, share identical child nodes, and share identical parent nodes.

In some cases, the method may include identifying, from the analyzing, at least two beta memories or at least two alpha memories that share identical child nodes and merging the at least two beta memories or the at least two alpha memories that share identical child nodes. In some cases, the method may include identifying, from the analyzing, at least two alpha test nodes that perform an identical test and share identical child nodes and merging the at least two alpha test nodes that perform the identical test and share identical child nodes.

In some embodiments, the method may include performing a security action based at least in part on the optimizing of the rearranged network. In some cases, the pattern matching system may include a Rete matching system. In some examples, the network of decision nodes may include a production rules system constructed according to the Rete matching system. In some cases, the converted rules may be implemented incrementally in the production rules system from a first or bottom-most level of child nodes to a last or top-most level of child nodes in the upstream direction.

A computing device configured for optimizing network decision nodes is also described. The computing device may include one or more processors and memory in electronic communication with the one or more processors. The memory may store computer executable instructions that when executed by the one or more processors cause the one or more processors to perform the steps of generating an initial network of decision nodes constructed according to one or more rules, rearranging one or more decision nodes of the initial network based at least in part on a conversion of the one or more rules to a disjunctive normal form, analyzing the rearranged network of decision nodes in an upstream direction, and optimizing the rearranged network by merging two or more decision nodes of the rearranged network based at least in part on the analysis of the rearranged network. In some cases, the decision nodes may include one or more levels of parent nodes and child nodes, each level of child nodes being connected to respective parent nodes. In some cases, the upstream direction may be in a direction from the child nodes to the parent nodes.

A non-transitory computer-readable storage medium storing computer executable instructions is also described. When the instructions are executed by one or more processors, the execution of the instructions may cause the one or more processors to perform the steps of generating an initial network of decision nodes constructed according to one or more rules, rearranging one or more decision nodes of the initial network based at least in part on a conversion of the one or more rules to a disjunctive normal form, analyzing the rearranged network of decision nodes in an upstream direction, and optimizing the rearranged network by merging two or more decision nodes of the rearranged network based at least in part on the analysis of the rearranged network. In some cases, the decision nodes may include one or more levels of parent nodes and child nodes, each level of child nodes being connected to respective parent nodes. In some cases, the upstream direction may be in a direction from the child nodes to the parent nodes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
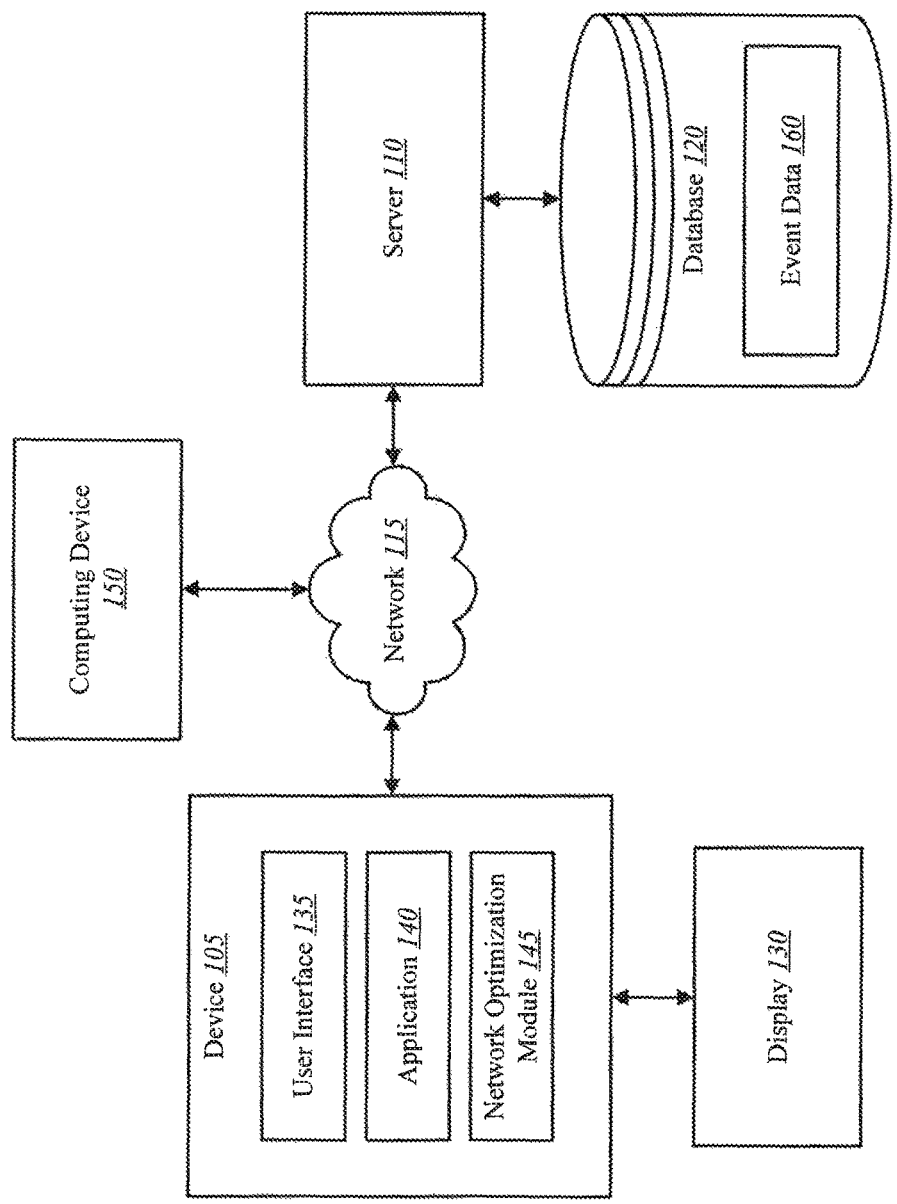
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to optimizing a network of decision nodes. More specifically, the systems and methods described herein relate to optimizing network decision nodes in relation to node sharing in disjunctive paths of a production rules system constructed according to a Rete matching algorithm.

In one example, a production rule system may be constructed according to the Rete algorithm. The traditional construction of a Rete network may specify that each rule include conjunctions of conditions (just ANDs, without ORs). However, since a network encodes many rules, disjunctions may be handled by splitting a disjunctive source rule into multiple rules. So, a source rule may first be converted to disjunctive normal form (DNF) and then split and compiled into multiple Rete paths (one for each disjunct). This approach facilitates the discovery of shared condition tests within and between rules. But, depending on the structure of the source rules, the approach may lead to an exponential increase in the number of Rete paths, reducing the advantage of node sharing.

The present systems and methods may include processing a database of facts looking for sets of facts that match conditions specified in rules. For example, the present systems and methods may process events on endpoints that are actively monitored and protected via antivirus and/or firewall software. In some cases, the present systems and methods may monitor fine-grained, low level events for every process on an endpoint, including data such as process and module loads, file and registry writes, and network connections, etc. In some cases, these rules may take the form "If (A or B or C) and (J or K or L) and (Y or Z) then Alert." Converting a source rule such as this into DNF results in a rule with multiple disjuncts.

The present systems and methods introduce an optimization strategy that maintains the traditional Rete algorithm's ability to find sharing and eliminate computational redundancy between rules while avoiding the exponential increase in network size and associated increased use of memory caused by DNF conversion of the rules. As one example, the optimization of the present systems and methods reduces a network implementing a realistic set of matching rules from about 238,000 nodes down to only 13,000 nodes.

This invention manages to reduce the size of Rete matching networks that arise from product-of-sum type source formulas or rules while still finding opportunities for sharing (redundant computation elimination) across rules at the level of the individual conditional tests within the constituent sums. The present systems and methods may include a specific, low-level optimization technique applied to a Rete matching network.

During traditional Rete construction, source rules may be incrementally added to the compiled network. If a prefix of the path that a rule needs to build already exists in the partially compiled network, the Rete algorithm may reuse that prefix. Since a second set of nodes is never constructed, no merging is taking place. The present systems and methods may include node merging in a post-processing analysis and transformation after the entire traditional Rete network has been built. The transformation soundly merges nodes to generate shared suffixes.

Accordingly, the present systems and methods may include at least one of building a standard Rete network, allowing nodes to have multiple parents, looking for disjunctive merging opportunities in post-processing optimization step, reducing complexity of decision by proceeding in a bottom-up manner, merging decision nodes based on simple, local equivalence tests, and merging two nodes when the two nodes perform the same test and they have the same children, or any combination thereof.

In Rete matching networks, nodes may perform conditional tests, and paths through the network from root to leaf may represent conjunctions of the conditions along the way. When multiple rules share one or more conjuncts, they may share the prefix of their path through the network. To maximize this sharing of nodes across different rules, the nodes perform small, atomic tests (as opposed to evaluating a complex logical formula). In the product-of-sums type rules described previously, one of the sums could be evaluated in its entirety, but then the ability to share computation across rules that both perform one of the individual atomic tests comprising the sum would be lost. Accordingly, instead the present systems and methods may convert rules to DNF, resulting in many paths that lead to the same action (and may perform redundant tests along the different disjunctive paths). To remedy this, the present systems and methods look for paths whose suffixes perform the same set of tests and merge them. The present systems and methods do this after the entire network has been built (meaning all rules have been compiled into it). Otherwise, the traditional Rete compilation may be hindered and the amount of standard "prefix" sharing that may be identified may be reduced. The decision on when nodes may be merged to create shared suffixes may be carefully designed to ensure the data structure modifications introduce minimal changes to the runtime mechanics of Rete network processing.

Matching rules are conjunctions of tests. Tests come in two flavors: intra-fact tests and join tests involving two facts. In Rete parlance, these may be referred to as alpha tests and beta tests respectively. The Rete algorithm compiles a set of rules into a network of nodes that perform the tests, or a directed acyclic graph (DAG). There are two parts to the network: the alpha network performs alpha tests (on individual facts) and the beta network performs beta tests (joins between two facts). Each alpha node performs a particular test. Rules that perform the same alpha test may reuse the same node. Nodes downstream from a test are not executed unless all of the upstream tests have succeeded (essentially, a directed graph where each path is a lazy AND). The leaf nodes in the alpha network are called alpha memories, and facts that match all the conditions on the path are stored in these memories. Individual facts are fed to the network, and stored in appropriate alpha memories if they match the intrafact conditions specified by at least one of the rules. While these alpha memories are leaf nodes of the alpha network, they are not leaf nodes of the overall combined Rete network. The alpha memories feed the beta network which consists of beta join nodes, beta memories, and beta action nodes. Each beta join node has one alpha memory as a parent and one beta memory as a parent. The beta join node springs into action only when one of its parent memories changes. When a fact is added to one of its parent memories, a beta join node checks if the new fact may be successfully joined with one of the facts in its other parent. If so, the beta join node stores this joined set of facts in its associated beta memory. As facts move deeper in the beta network, more and more facts are joined together. The true leaf nodes in the Rete network are the beta action nodes. When these nodes are activated, all of the tests for a match rule have been satisfied, meaning the network has found a fact for each of the rule's fact variables that meets all of the alpha (intra-fact) tests in the rule and this set of facts meet all of the beta (join) tests in the rule. At this point the appropriate, application-specific action may be taken (generating a new fact, emitting an alert, etc.).

As one example, a first rule R1 may include: IF (A or B or C) and (J or K or L) and (Y or Z) THEN Alert 1, which may be written as IF (A+B+C)*(J+K+L)*(Y+Z) THEN Alert 1. The present systems and methods may compile this into a network of three test nodes (one for each sum) and an action node for Alert 1. But then, if a second rule R2 is introduced: IF A*J THEN Alert 2, the present systems and methods may not be able to share any nodes (and thus any computation at runtime) with the previous rule based on conventional Rete network. If instead, if R1 is converted to DNF, then R1 and R2 may be share the two nodes that test for A and J. But the size of the network becomes very large with three nodes each for conditions J, K, and L, nine nodes each for Y and Z, and eighteen copies of an action node for Alert 1. In one embodiment, the present systems and methods may build out the entire network by converting all rules to DNF and incrementally adding them to the compiled network, finding shared prefix paths as usual in Rete. Then in a post-processing optimization, the present systems and methods may traverse the graph bottom up (from child nodes to parent nodes), looking for opportunities to merge nodes that perform the same function. This merging may include lifting the structural restriction present in traditional Rete that alpha nodes have a single parent and beta join nodes have one alpha and one beta parent. Note that merging two nodes is only safe if all tests/joins/actions downstream from the two nodes are equivalent. Accordingly, the present systems and methods proceed in a bottom up manner, reducing the downstream suffix equivalence test to an equality test on direct children. When two nodes are merged, the child pointers in each of the node's parents may be updated to point to the merged node.

How to decide whether it is safe to merge two nodes varies by node type. For example, for beta action node, these leaf nodes may be combined if these nodes perform the same action. Two beta join nodes may be combined if (a) they have the same children, (b) they perform the same join test, and (c) either they have the same alpha parent(s) or they have the same beta parent(s). The merged node may have the union of the two nodes' alpha parents as its alpha parents and the union of the two nodes' beta parents as its beta parents. This may be implemented using two new node types: Alpha Memory Union and Beta Memory Union. This is safe because $(A*B)+(A*C)=A*(B+C)$. In one embodiment, the present systems and methods are configured not to perform the unsound 'optimization' that would turn $(A*B)+(C*D)$ into $(A+C)*(B+D)$. Next, two beta memories may be merged if they have the same children. Two alpha memories may be merged if they have the same children. Two alpha test nodes may be merged if: (a) they have the same children and (b) they perform the same test. In some cases, except for beta join nodes, no other node types need parent pointers, but instead receive activations from above and conditionally pass them downstream. Accordingly, in some cases the only modification to the runtime behavior of the network is to allow support for the new alpha and beta memory union nodes. When a join node requests matches from a union node, all matches from each of the constituent memories may be returned. Similarly, union nodes may pass along activations for all of their constituent memories.

As one example, the optimization of the present systems and methods may be used in relation to a set of rules configured to look for a variety of suspicious or otherwise interesting patterns, including a kind of "fuzzy" n-gram behavioral signature. Implementing the present systems and methods includes more than an 18× reduction in network size compared to a conventional Rete network. For instance, converting 2,550 source rules that include 24,800 atomic alpha tests plus joins to DNF results in 210,000 simple conjunction rules comprised of 2 million atomic alpha tests plus joins. Using standard Rete construction (without disjunctive optimization) results in 238,000 nodes including 6,100 alpha test nodes. Implementing the disjunctive optimization of the present systems and methods results in 13,000 nodes including 2,600 alpha test nodes, which is over an 18× reduction in network size compared to conventional implementations.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a computing device 150, and a network 115 that allows the device 105, the server 110, and the computing device 150 to communicate with one another.

Examples of the device 105 may include any combination of mobile devices, smart phones, personal computing devices, computers, laptops, desktops, servers, media content set top boxes, digital video recorders (DVRs), or any combination thereof. Examples of computing device 150 may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof.

In some configurations, the device 105 may include a user interface 135, application 140, and network optimization module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, network optimization module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a network optimization module 145. For example, device 105 may include application 140 that allows device 105 to interface with one or more remote computing devices via network optimization module 145 located on another device such as computing device 150 and/or server 110. In some embodiments, device 105, computing device 150, and server 110 may include a network optimization module 145 where at least a portion of the functions of network optimization module 145 are performed separately and/or concurrently on device 105, computing device 150, and/or server 110. Likewise, in some embodiments, a user may access the functions of device 105 (directly or through device 105 via network optimization module 145) from computing device 150. For example, in some embodiments, computing device 150 includes a mobile application that interfaces with one or more functions of device 105, network optimization module 145, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly to computing 150 and/or or one or more network devices such as a gateway, switch, router, intrusion detection system, etc. Database 120 may include event data 160. As one example, device 105 may access event data 160 in database 120 over network 115 via server 110. Event data 160 may include data regarding events occurring on monitored endpoints such as client machines, monitored desktop computing devices, monitored laptop computers, monitored mobile computing devices, and the like. In some cases, event data 160 may include telemetry data sourced from one or more monitored client machines. Examples of event data may include data such as process and module loads, file and registry writes, and network connections, etc.

Network optimization module 145 may enable optimization of network decision nodes for a pattern matching system. In some cases, network optimization module 145 may include at least one of one or more processors, one or more customized processors, one or more memory devices, one or more storage devices, instructions and/or software code stored in the one or more memory device and/or storage devices, firmware, or any combination thereof. In some embodiments, network optimization module 145 may be configured to perform the systems and methods described herein in conjunction with user interface 135 and application 140. User interface 135 may enable a user to interact with, control, and/or program one or more functions of network optimization module 145. Further details regarding the network optimization module 145 are discussed below.

Figure 2:
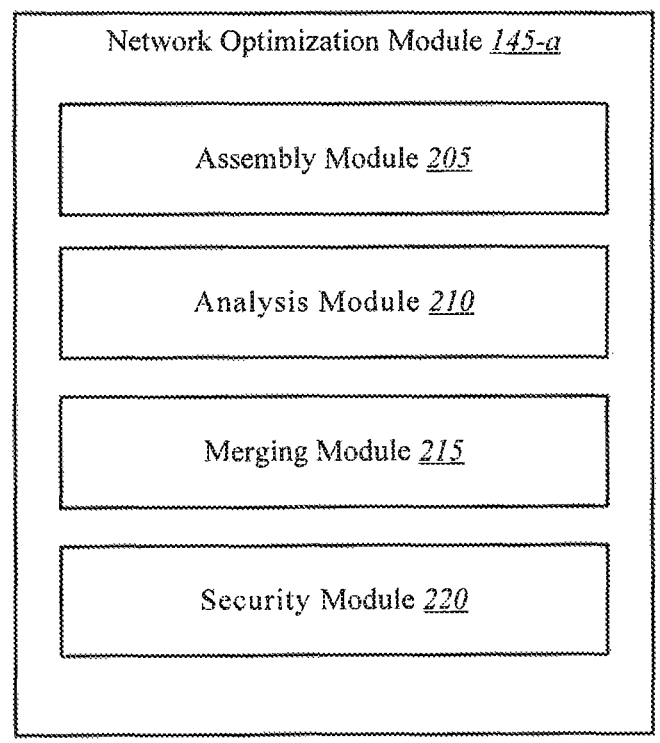
FIG. 2 is a block diagram illustrating one example of one or more modules in accordance with various aspects of this disclosure.

FIG. 2 is a block diagram illustrating one example of a network optimization module 145-*a*. Network optimization module 145-*a* may be one example of network optimization module 145 depicted in FIG. 1. As depicted, network optimization module 145-*a* may include assembly module 205, analysis module 210, merging module 215, and security module 220.

In one embodiment, assembly module 205 may be configured to generate an initial network of decision nodes. In some cases, assembly module 205 may construct the initial network of decision nodes according to a pattern matching system. In some embodiments, assembly module 205 may construct the initial network of decision nodes according to a Rete matching system. In some cases, assembly module 205 may construct the network of decision nodes according to a pattern matching algorithm. In some embodiments, the pattern matching algorithm may include a Rete matching algorithm. In some cases, the network of decision nodes may include a production rules system constructed according to a Rete algorithm. Additionally or alternatively, assembly module 205 may construct the initial network of decision nodes according to one or more rules. In some embodiments, the network of decision nodes may include one or more respective levels of parent nodes and child nodes. In some cases, a child node may be connected to one or more corresponding parent nodes.

In some embodiments, assembly module 205 may be configured to convert at least one of the one or more rules to a disjunctive normal form. In some cases, the rules converted to disjunctive normal form may be implemented incrementally in the production rules system from a first level of child nodes to a last level of child nodes in the upstream direction. In some cases, the one or more rules include a set of source rules used to build the network of decision nodes. In some embodiments, one or more rules may be provided by an administrator of the network of decision nodes. As an example, rules may be generated according to patterns an administrator is interested in detecting in data that is fed through the pattern matching system. In some embodiments, at least a portion of the rules implemented in the pattern matching algorithm are converted to the disjunctive normal form. In some cases, each of the rules implemented in the pattern matching algorithm are converted to the disjunctive normal form.

In some embodiments, assembly module 205 may be configured to rearrange one or more decision nodes of the initial network based on the conversion of the one or more rules to the disjunctive normal form. In some cases, implementing the converted rules may result in assembly module 205 rearranging the layout of nodes in the network of decision nodes. For example, implementing the converted rules may result in assembly module 205 merging or sharing one or more nodes of the initial network of decision nodes and/or removing one or more nodes from the initial network of decision nodes.

In some embodiments, analysis module 210 may be configured to analyze the rearranged network of decision nodes in an upstream direction. In some cases, the upstream direction may be in a direction iteratively from child nodes to parent nodes on each respective level of the network of decision nodes.

In some embodiments, merging module 215 may be configured to optimize the rearranged network by merging two or more decision nodes of the rearranged network based at least in part on the analysis of the rearranged network. In some embodiments, merging module 215 may update child pointers from the parent nodes of the two nodes being merged to point to the merged node.

In some cases, the network of decision nodes may include one or more node types. In some examples, the one or more node types may include at least one of a beta action node, a beta join node, an alpha test node, a beta memory node, and an alpha memory node, or any combination thereof. In some cases, at least one child node from the network of decision nodes is connected upstream to two or more parent nodes of the same node type.

In some cases, analysis module 210 may identify potential shareable nodes based at least in part on the analysis module 210 analyzing the rearranged network of decision nodes in an upstream direction. In some embodiments, analysis module 210 may identify potential shareable nodes or nodes with potential to be merged based at least in part on nodes sharing at least one aspect such as nodes that perform an identical action or test, nodes that share identical child nodes, nodes that share identical parent nodes, or any combination thereof.

It is noted that the phrase "at least two nodes share identical child nodes" may mean that the at least two nodes each have a single children node and the at least two nodes share the same single children node. Additionally or alternatively, the phrase "at least two nodes share identical child nodes" may mean that the at least two nodes each have two or more child nodes and the at least two nodes share the same two or more child nodes. Similarly, the phrase "at least two nodes share identical parent nodes" may mean that the at least two nodes each have a single parent node and the at least two nodes share the same single parent node. Additionally or alternatively, the phrase "at least two nodes share identical parent nodes" may mean that the at least two nodes each have two or more parent nodes and the at least two nodes share the same two or more parent nodes.

In one example, analysis module 210 may be configured to identify at least two beta action nodes that perform an identical action. In some embodiments, merging module 215 may be configured to merge the at least two beta action nodes that perform the identical action.

In some embodiments, analysis module 210 may be configured to identify at least two beta join nodes that perform an identical join test, share identical child nodes, and share identical parent nodes. In some cases, the identical parent nodes may include either the same alpha memory parent nodes or the same beta join parent nodes. In some embodiments, merging module 215 may be configured to merge the at least two beta join nodes that perform the identical join test, share identical child nodes, and share identical parent nodes.

In some embodiments, analysis module 210 may be configured to identify at least two beta memories or at least two alpha memories that share identical child nodes. In some embodiments, merging module 215 may be configured to merge the at least two beta memories or the at least two alpha memories that share identical child nodes.

In some embodiments, analysis module 210 may be configured to identify at least two alpha test nodes that perform an identical test and share identical child nodes. In some embodiments, merging module 215 may be configured to merge the at least two alpha test nodes that perform the identical test and share identical child nodes.

In some embodiments, security module 220 may be configured to perform a security action based at least in part on the network optimization module 145 optimizing the rearranged network according to the operations of at least one of the assembly module 205, analysis module 210, merging module 215, and security module 220, or any combination thereof, described herein.

Figure 3:
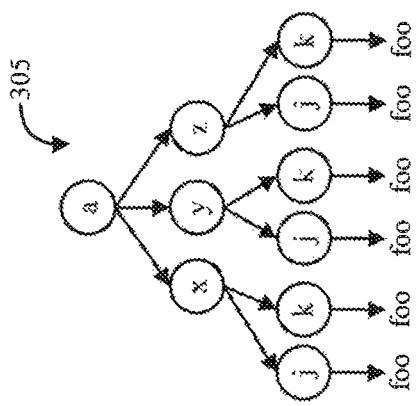
FIG. 3 is an example configuration in accordance with various aspects of this disclosure.
Figure 3:
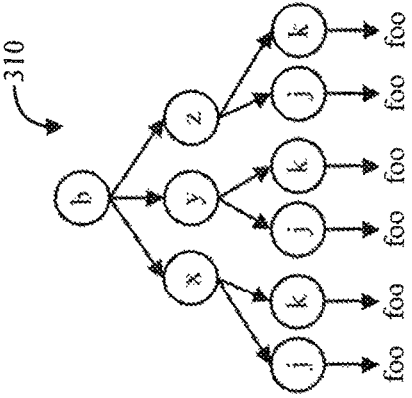
Figure 3:
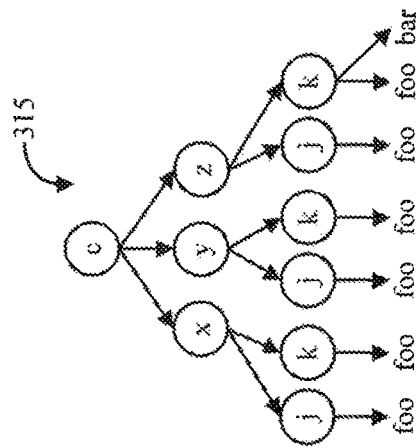

FIG. 3 illustrates one example of an environment for optimizing network decision nodes. FIG. 3 depicts one example of an implementation of a pattern matching network of decision nodes 300 based on one or more rules. In the provided example, the pattern matching system may include a first rule R1 of: IF (a or b or c) and (x or y or z) and (j or k) THEN send foo, and a second rule R2 of: IF c and z and k THEN send bar. In some configurations, the network of decision nodes 300 may be implemented by the network optimization module 145 illustrated in FIGS. 1 and/or 2. In some configurations, the network of decision nodes 300 may be implemented in conjunction with device 105, server 110, network 115, database 120, components thereof, or any combination thereof.

In some embodiments, the rules R1 and R2 may be converted into a product of sums. Thus, in one embodiment, the given rules may be arranged into a series of logical sums and products such as "a and x and j," or "a and x and k," or "a and y and j," "a and y and k," and so on, resulting in 18 disjuncts (i.e., axj+axk+ayj+ . . . cyk+czj+czk) from only two rules R1 and R2.

In the illustrated example, a set of decision trees 305, 310, and 315 may be constructed from the given rules. There is no concept of a logical OR between the nodes of a given tree. Instead, a logical OR is implemented by creating a second decision tree, and thus, the three separate decision trees 305, 310, and 315 are generated respectively for each of the possible "a" or "b" or "c" paths. Accordingly, each path of each decision tree begins with "a" or "b" or "c," and is made of one or more paths of logical ANDs, which may be referred to as lazy ANDs.

As shown in the illustrated example of FIG. 3, a fair amount of redundancy results from only two rules, indicating that handling disjunction as shown may result in significant redundancy. The redundancy of FIG. 3 indicates that increasing the number and/or complexity of rules may result in a significantly larger network of decision nodes, and even a small addition to the rules may result in an exponential addition to the network of decision nodes, resulting in a significant consumption of hardware system resources such as system memory and/or system processors.

Figure 4:
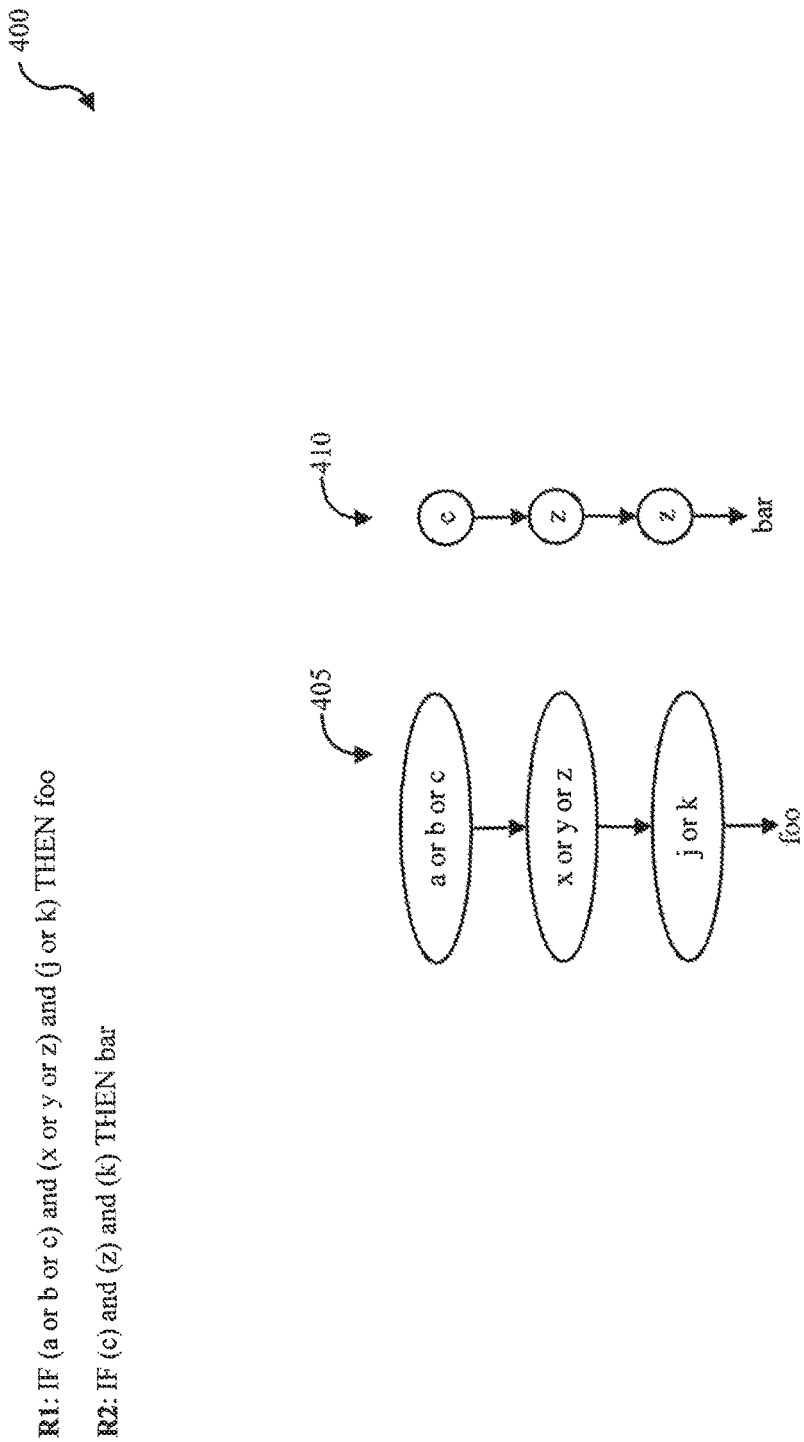
FIG. 4 is an example configuration in accordance with various aspects of this disclosure.

FIG. 4 illustrates one example of an environment for optimizing network decision nodes. FIG. 4 illustrates one example of an implementation of a pattern matching network of decision nodes 400 based on one or more rules. As shown, the network of decision nodes 400 may be constructed based on the same rules provided in relation to FIG. 3. In some configurations, the network of decision nodes 400 may be implemented by the network optimization module 145 illustrated in FIGS. 1 and/or 2. In some configurations, the network of decision nodes 400 may be implemented in conjunction with device 105, server 110, network 115, database 120, components thereof, or any combination thereof.

In one embodiment, FIG. 4 illustrates one configuration to reduce the impact of the network of decision nodes on system resources by putting all the ORs into a single node, or combining the disjunctive clauses and putting them in a single node such as a single alpha node. As shown, (a or b or c) may be placed in a first node of a first decision tree 405, (x or y or z) is in a second node of the first decision tree 405, (j or k) is in a third node of the first decision tree 405. Similarly, (c), (z), and (k) may each be placed in their own separate nodes of a second decision tree 410. However, by combining disjunctive clauses and test in a single node, the node sharing and avoidance of redundant computation benefits of a Rete network are lost, undermining one of the purposes of implementing a Rete algorithm. One of the results of implementing the Rete algorithm is splitting the single event tests into fine grained tests so that the tests can be shared across multiple rules, such as where (c and z and k) from R1 and (c and z and k) from R2 both share node (k) resulting in a triggering of both "foo" and "bar" when (c and z and k) occurs. Thus, it would be better if the restriction from the traditional Rete implementation that alpha nodes have a single parent and beta nodes have one parent of each type could be lifted.

Figure 5A:
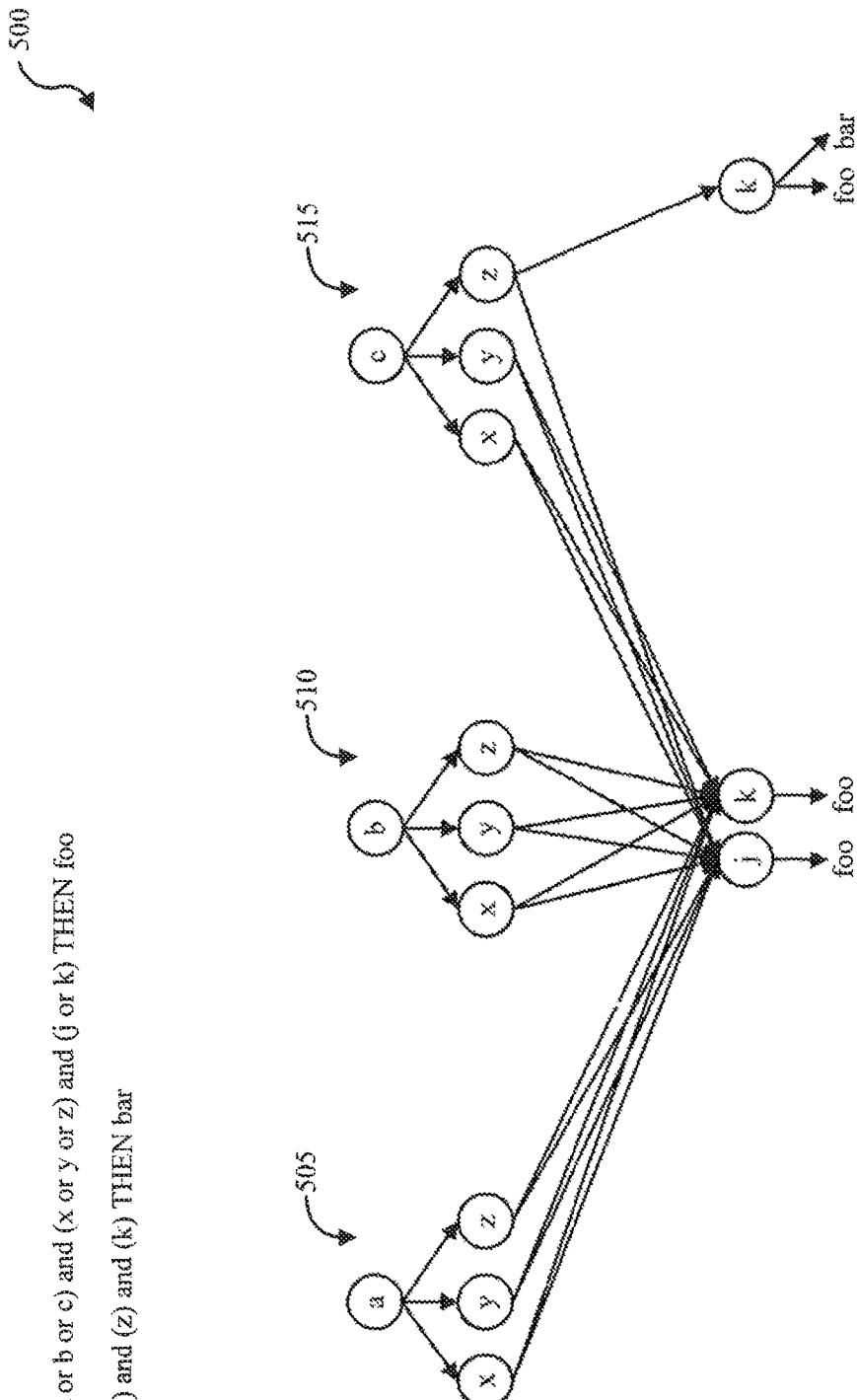
FIG. 5A is an example configuration in accordance with various aspects of this disclosure.
Figure 5B:
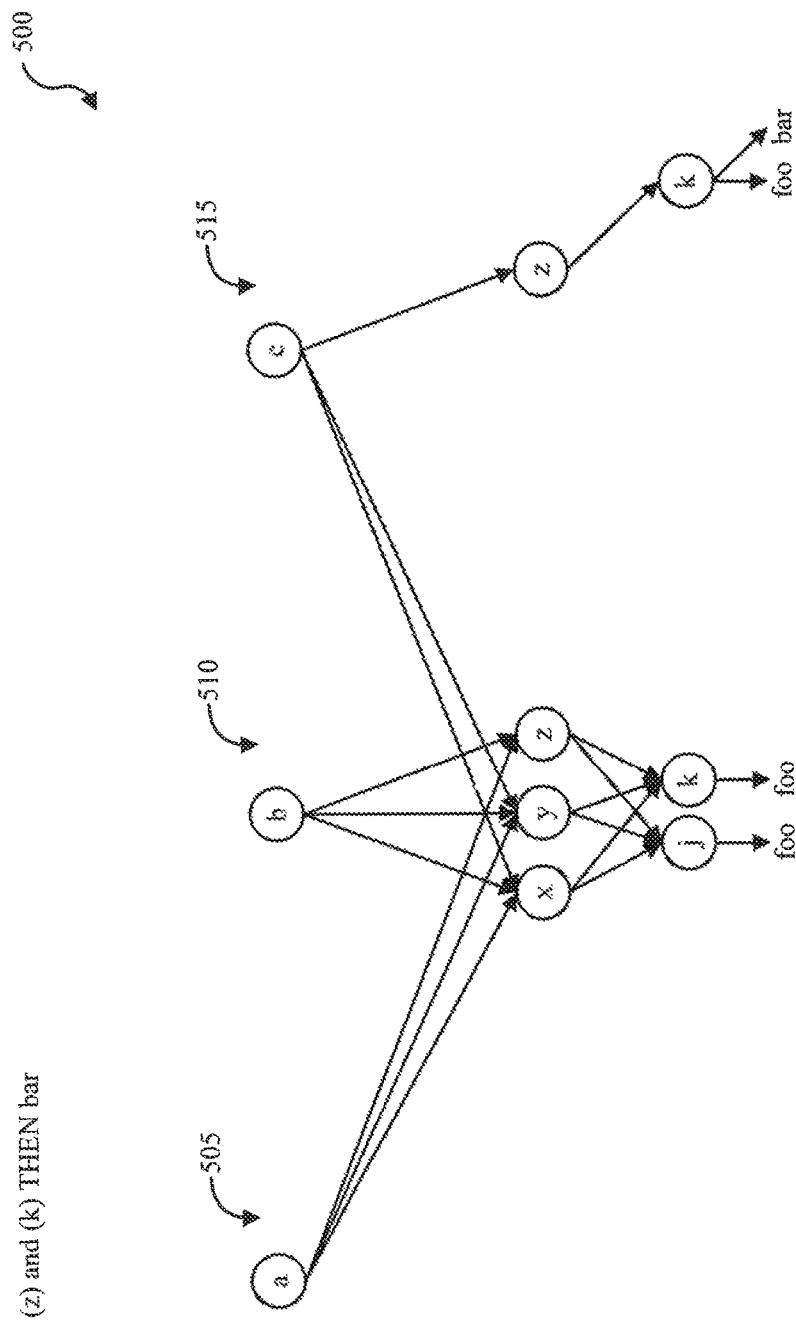
FIG. 5B is an example configuration in accordance with various aspects of this disclosure.
Figure 5C:
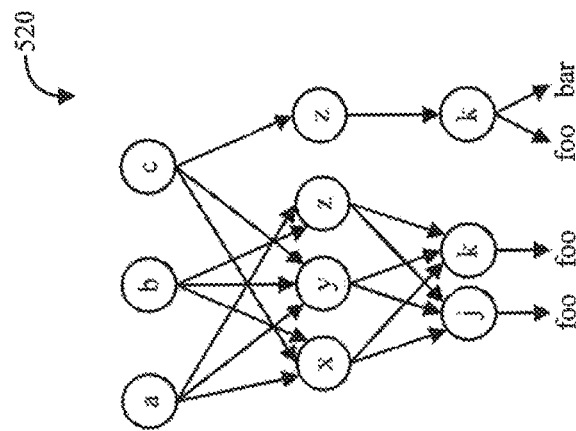
FIG. 5C is an example configuration in accordance with various aspects of this disclosure.

Another solution may include implementing an eager disjoin while the network of decision nodes is being constructed. However, when nodes are eagerly reused in a disjunctive manner while building the network for rules R1 and R2, the z node is not reusable for the second rule R2, which results in a second z node being added below the c node. Accordingly, the c node points to a first z node that is also pointed to by the a node and b node, and also points to a second z node that only the c node points to. This is because the z and k nodes cannot be reused for the second rule R2 because then a path starting from node a or node b could result in triggering "bar," which the rules do not support, instead of only (c and z and k) triggering "bar." Thus, an implementation of eagerly reusing nodes in a disjunctive manner while the network is being constructed results in a reduction in the opportunity for node sharing as well as an increase in the complexity of decision paths FIGS. 5A, 5B, and 5C illustrate one example of an environment for optimizing network decision nodes. In some cases, FIGS. 5A, 5B, and 5C illustrate one example of an improved implementation of a pattern matching network of decision nodes 500 based on one or more rules. As shown, the network of decision nodes 500 may be constructed based on the same rules provided in relation to FIG. 3 and/or FIG. 4 to illustrate the operations in optimizing the network of decision nodes. In some configurations, the network of decision nodes 500 may be implemented by the network optimization module 145 illustrated in FIGS. 1 and/or 2. In some configurations, the network of decision nodes 500 may be implemented in conjunction with device 105, server 110, network 115, database 120, components thereof, or any combination thereof.

The improved implementation of FIG. 5A illustrates the operations of building a Rete network, but then enabling a node to have multiple parents at a later period of construction. Thus, first a Rete network may be constructed with a set of decision trees 505, 510, and 515 constructed according to the construction of the set of decision trees 305, 310, and 315 from FIG. 3. After this initial Rete network is constructed, the present systems and methods may scan the constructed Rete network in a bottom-up direction, starting at the first or lowest level of child nodes and moving upwards from child nodes to parent nodes. For example, with the network of decision nodes 500 constructed as shown in FIG. 3, the present systems and methods may analyze paths starting with the j and k child nodes in relation to the x, y, and z parent nodes to determine which child nodes may be merged. Based on this analysis, the present systems and methods may determine that all the j nodes look the same (e.g., all j nodes have the same parent nodes, and the same result of "foo"). Accordingly, all of the j nodes may be merged into a single j node resulting in each of the x, y, and z parent nodes all pointing to the single j node as illustrated in FIG. 5A. Similarly, the present systems and methods may determine that all the k nodes look the same as well, except for the last k node on the right that is from the c-z-k path derived from the second rule R2. Accordingly, the k nodes that stem from the a and b nodes may be merged into a first single k node as illustrated in FIG. 5A, resulting in each of the x, y, and z parent nodes from nodes a and b all pointing to the first single k node. Additionally, a second single k node, which may be the original k node that stems from node c, may remain in the network of decision nodes as shown in FIG. 5A.

Next, in FIG. 5B the present systems and methods may analyze paths starting with the x, y, and z as child nodes in relation to parent nodes a, b, and c to determine which of these child nodes may be merged. At this level, all the x and y nodes look the same, so all of the x and y nodes may be merged into a single x node and a single y node, resulting in each of the a, b, and c parent nodes each pointing to the single x node as well as each pointing to the single y node as shown in FIG. 5B. Similarly, all the z nodes look the same as well, except for the last z node on the right from the c-z-k path derived from the second rule R2. Accordingly, the z nodes that stem from the a and b nodes may be merged into a first single z node, resulting in each of the a and b parent nodes all pointing to the first single z node as shown in FIG. 5B. Additionally, a second single z node, which may be the original z node that stems from node c, may remain in the network of decision nodes 500 as shown in FIG. 5B.

Accordingly, in some embodiments, an initial Rete network may be constructed; nodes from the initial Rete network may be allowed to have multiple parents; in a post-construction optimization step the initial Rete network may be scanned for disjunctive merging opportunities after finishing construction of the initial Rete network; the complexity of decision paths made be reduced by scanning the initial Rete network in a bottom-up manner from child nodes to parent nodes; decision nodes may be merged using one or more local equivalence tests based on node type; and two nodes of the same node type may be merged if the two nodes satisfy an equivalence test associated with the node type of the two nodes. Accordingly, as shown in FIG. 5C, several nodes from the initial set of decision trees 505, 510, and 515 may be merged to form an improved Rete network of decision nodes 520 by systematically merging nodes from the initial Rete network in accordance with various aspects of this disclosure.

Figure 6:
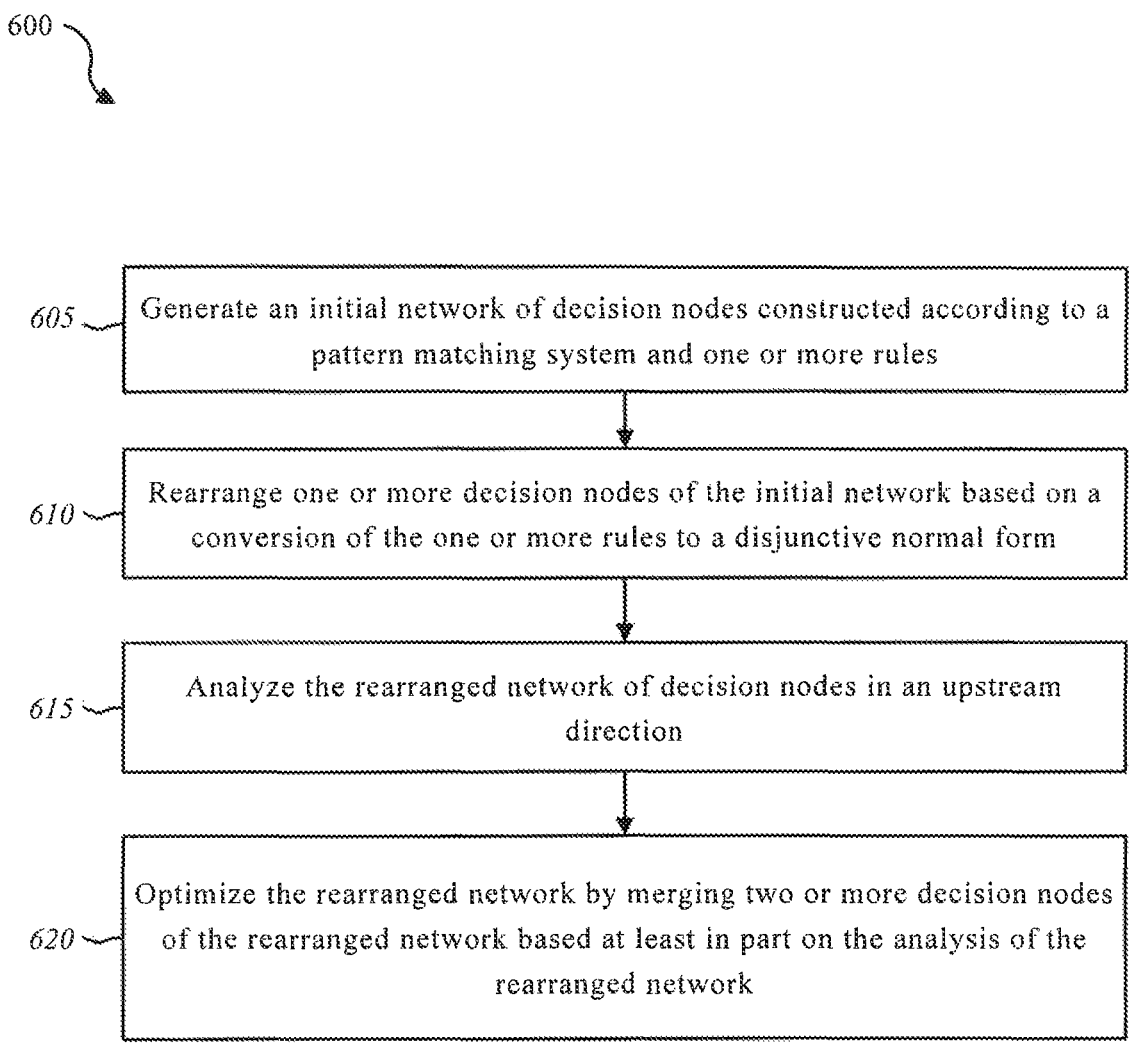
FIG. 6 is a flow diagram illustrating one embodiment of a method in accordance with various aspects of this disclosure.

FIG. 6 is a flow diagram illustrating one embodiment of a method 600 for optimizing network decision nodes. In some configurations, the method 600 may be implemented by the network optimization module 145 illustrated in FIGS. 1 and/or 2. In some configurations, the method 600 may be implemented in conjunction with device 105, server 110, network 115, database 120, components thereof, or any combination thereof.

Figure 7:
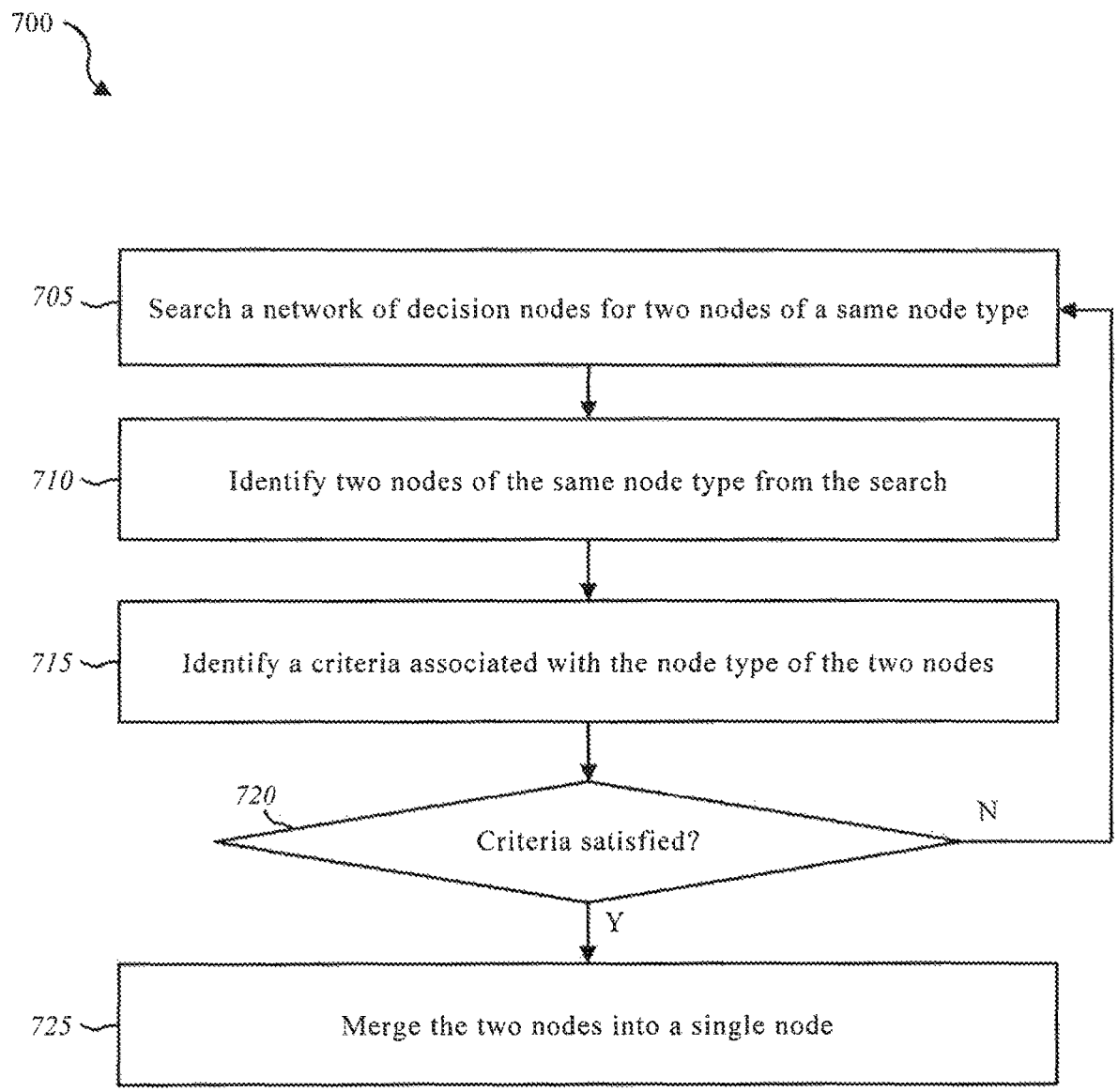
FIG. 7 is a flow diagram illustrating one embodiment of a method in accordance with various aspects of this disclosure.

At block 605, method 600 may include generating an initial network of decision nodes constructed according to a pattern matching system and one or more rules. In some cases, the decision nodes may include parent nodes and child nodes where the child nodes are connected to the parent nodes. At block 610, method 600 may include rearranging one or more decision nodes of the initial network based on a conversion of the one or more rules to a disjunctive normal form. At block 615, method 600 may include analyzing the rearranged network of decision nodes in an upstream direction. In some cases, the upstream direction may be in a direction from child nodes to parent nodes. At block 620, method 600 may include optimizing the rearranged network by merging two or more decision nodes of the rearranged network based at least in part on the analysis of the rearranged network FIG. 7 is a flow diagram illustrating one embodiment of a method 700 for optimizing network decision nodes. In some configurations, the method 700 may be implemented by the network optimization module 145 illustrated in FIG. 1 or 2. In some configurations, the method 700 may be implemented in conjunction with device 105, server 110, network 115, database 120, components thereof, or any combination thereof.

At block 705, method 700 may include searching a network of decision nodes for two nodes of a same node type. In some cases, method 700 may search the network of decision nodes in an upstream direction. In some cases, the upstream direction may be in a direction from child nodes to parent nodes.

At block 710, method 700 may include identifying two nodes of the same node type from the search. In some cases, the two nodes may be from an initial network of decision nodes rearranged according to a conversion of one or more rules to a disjunctive normal form. In some embodiments, the initial network of decision nodes may be constructed according to the one or more rules before the one or more rules are converted to the disjunctive normal form.

At block 715, method 700 may include identifying a criteria associated with the node type of the two nodes. In some cases, the criteria has at least one criterion. In some embodiments, the network of decision nodes may include nodes of two or more types. In some cases, each node type may be associated with a criteria unique to the node type.

At block 720, method 700 may determine whether the two nodes satisfy the associated criteria. When the criteria are satisfied, at block 725 method 700 may merge the two nodes into a single node. In some embodiments, method 700 may update the child pointers of the parent nodes of the two nodes being merged to point to the merged node. In some cases, the single node is of the same node type as the two nodes being merged. Accordingly, the single node may include at least one of the same configuration as the two nodes being merged, the same parent nodes as the two nodes being merged, the same child nodes as the two nodes being merged, perform the same action as the two nodes being merged, perform the same test as the two nodes being merged, or any combination thereof.

When the criteria are not satisfied, the method 700 may return to block 705 to perform another search for two nodes of the same node type. In some cases, after analyzing node A and node B of the same node type and determining nodes A and B do not satisfy the associated criteria, method 700 may select two entirely new nodes such as node C and node D to analyze, which may be of the same or different node type as nodes A and B. Additionally or alternatively, method 700 may continue to analyze at least one of node A and node B in relation to other nodes. For example, after determining the node A and node B do not satisfy the associated criteria, method 700 may analyze node A in relation to a node D of the same node type as node A to determine if node A and node D satisfy the associated criteria, and/or analyze node B in relation to a node C of the same node type as node B to determine if node B and node C satisfy the associated criteria, etc.

Figure 8:
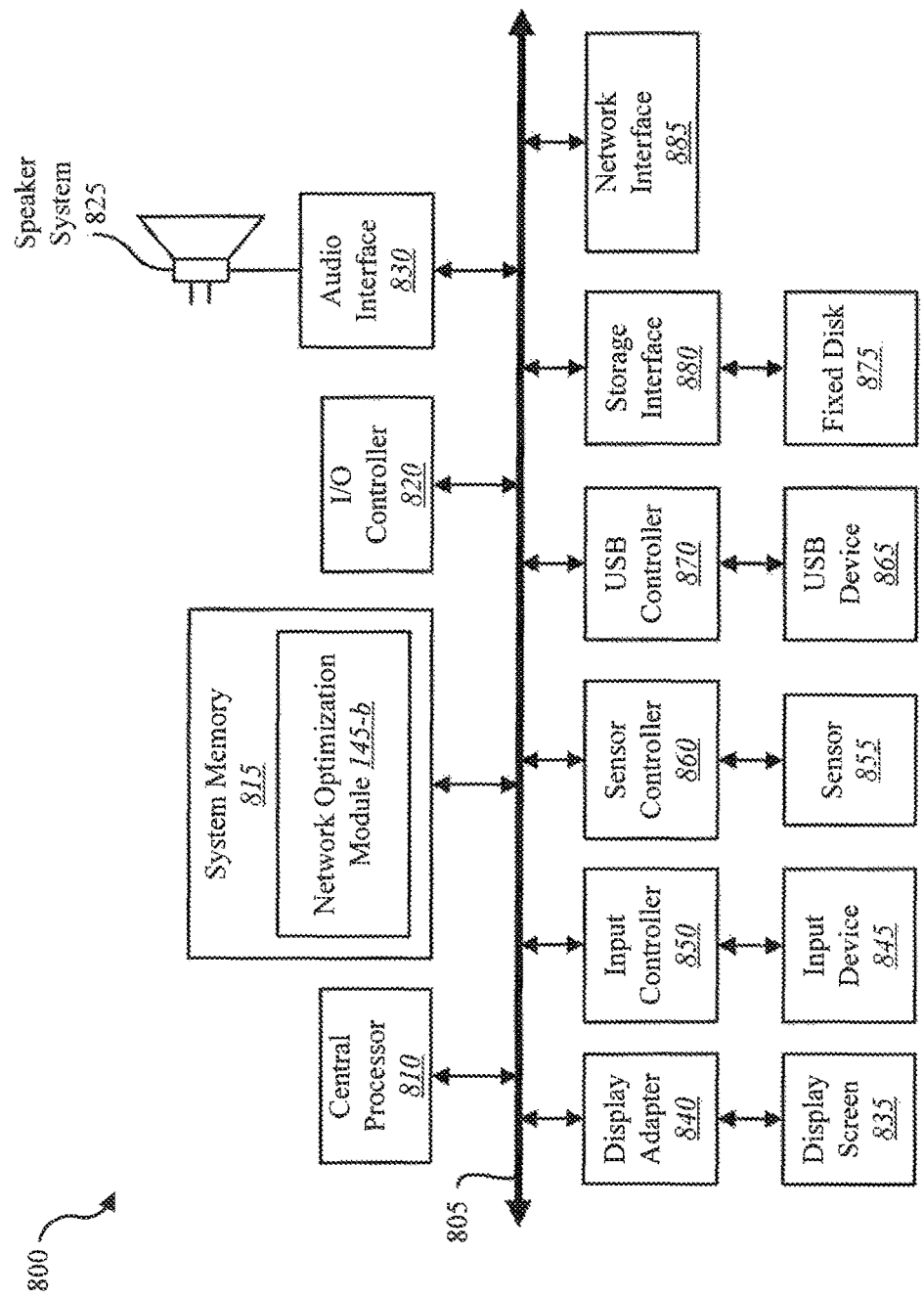
FIG. 8 depicts a block diagram of a computer system suitable for implementing the present systems and methods.

FIG. 8 depicts a block diagram of a computing device 800 suitable for implementing the present systems and methods. The device 800 may be an example of device 105, computing device 150 and/or server 110 illustrated in FIG. 1. In one configuration, device 800 includes a bus 805 which interconnects major subsystems of device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the network optimization module 145-b to implement the present systems and methods may be stored within the system memory 815. Applications (e.g., application 140) resident with device 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of device 800, can connect to a standard computer readable medium for storage and/or retrieval of information, such as a fixed disk drive 875. Fixed disk drive 875 may be a part of device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 800 wirelessly via network interface 885.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on device 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 885 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 820 may operate in conjunction with network interface 885 and/or storage interface 880. The network interface 885 may enable system 800 with the ability to communicate with client devices (e.g., device 105 of FIG. 1), and/or other devices over the network 115 of FIG. 1. Network interface 885 may provide wired and/or wireless network connections. In some cases, network interface 885 may include an Ethernet adapter or Fibre Channel adapter. Storage interface 880 may enable system 800 to access one or more data storage devices. The one or more data storage devices may include two or more data tiers each. The storage interface 880 may include one or more of an Ethernet adapter, a Fibre Channel adapter, Fibre Channel Protocol (FCP) adapter, a SCSI adapter, and iSCSI protocol adapter.

Figure 9:
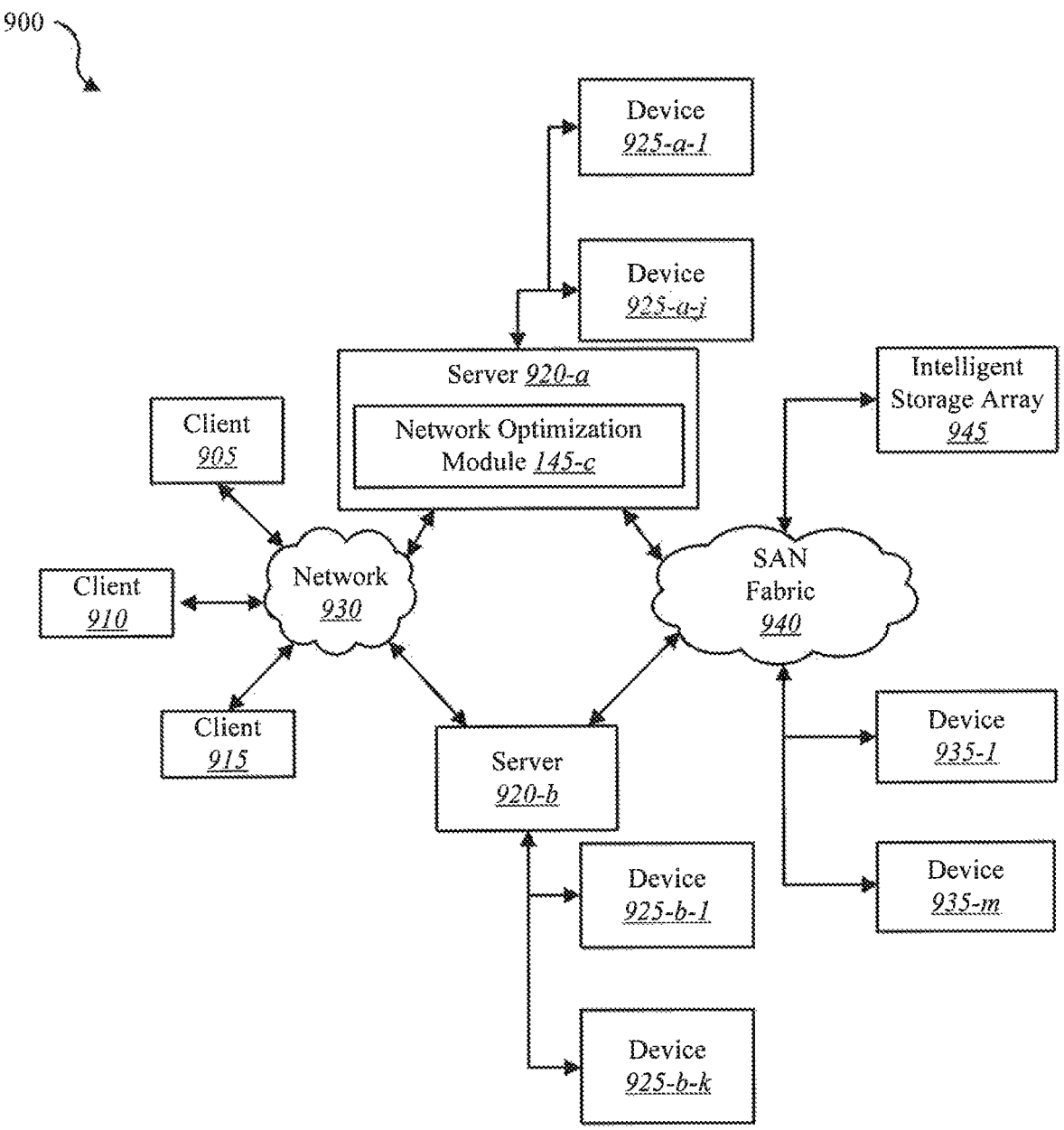
FIG. 9 depicts a block diagram of a computer system suitable for implementing the present systems and methods.

FIG. 9 is a block diagram depicting a network architecture 900 in which client systems 905, 910 and 915, as well as storage servers 920-a and 920-b (any of which can be implemented using computer system 800), are coupled to a network 930. In one embodiment, network optimization module 145-c may be located within one of the storage servers 920-a, 920-b to implement the present systems and methods. Network optimization module 145-c may be one example of network optimization module 145 depicted in FIGS. 1, 2, and/or 6. The storage server 920-a is further depicted as having storage devices 925-a-1 through 925-a-j directly attached, and storage server 920-b is depicted with storage devices 925-b-1 through 925-b-k directly attached. SAN fabric 940 supports access to storage devices 935-1 through 935-m by storage servers 920-a and 920-b, and so by client systems 905, 910 and 915 via network 930. Intelligent storage array 945 is also shown as an example of a specific storage device accessible via SAN fabric 940.

With reference to computer system 800, network interface 885 or some other method can be used to provide connectivity from each of client computer systems 905, 910 and 915 to network 930. Client systems 905, 910 and 915 are able to access information on storage server 920-a or 920-b using, for example, a web browser or other client software (not shown). Such a client allows client systems 905, 910 and 915 to access data hosted by storage server 920-a or 920-b or one of storage devices 925-a-1 to 925-a-j, 925-b-1 to 925-b-k, 935-1 to 935-m or intelligent storage array 945. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method for optimizing a network of decision nodes for a pattern matching system, the method comprising:
    generating, by one or more computing devices each comprising at least one processor, an initial network of decision nodes constructed according to one or more rules, the decision nodes comprising one or more levels of parent nodes and child nodes, each level of child nodes being connected to respective parent nodes;
    rearranging, by the one or more computing devices, one or more decision nodes of the initial network based at least in part on a conversion of the one or more rules to a disjunctive normal form;
    analyzing, by the one or more computing devices, the rearranged network of decision nodes in an upstream direction, the upstream direction being in a direction from the child nodes to the parent nodes;
    identifying a set of decision nodes based at least in part on analyzing the rearranged network, a first decision node of the set comprising a first parent node and a first child node and a second decision node of the set comprising a second parent node and a second child node, wherein the first parent node and the second parent node each perform a same test and the first child is identical to the second child node;
    optimizing, by the one or more computing devices, the rearranged network by merging the set of decision nodes based at least in part on the analysis of the rearranged network and the identifying, wherein optimizing the rearranged network causes at least one child node of the first child node and the second child node to be connected upstream to at least two alpha parent nodes or at least two beta parent nodes at a decision level; and
    performing a security action based at least in part on the optimizing of the rearranged network.

2. The computer-implemented method of claim 1, wherein the network of decision nodes includes one or more node types, the one or more node types including at least one of a beta action node, a beta join node, an alpha test node, a beta memory node, and an alpha memory node, or any combination thereof.

3. The computer-implemented method of claim 2, wherein the at least one child node is connected upstream to two or more parent nodes of a same node type.

4. The computer-implemented method of claim 2, comprising:
    identifying, from the analyzing, at least two beta action nodes that perform an identical action; and
    merging the at least two beta action nodes that perform the identical action.

5. The computer-implemented method of claim 2, comprising:
    identifying, from the analyzing, at least two beta join nodes that perform an identical join test, share identical child nodes, and share identical parent nodes, the identical parent nodes including either the same alpha memory parent nodes or the same beta join parent nodes; and
    merging the at least two beta join nodes that perform the identical join test, share identical child nodes, and share identical parent nodes.

6. The computer-implemented method of claim 2, comprising:
    identifying, from the analyzing, at least two beta memories or at least two alpha memories that share identical child nodes; and
    merging the at least two beta memories or the at least two alpha memories that share identical child nodes.

7. The computer-implemented method of claim 2, comprising:
    identifying, from the analyzing, at least two alpha test nodes that perform an identical test and share identical child nodes; and
    merging the at least two alpha test nodes that perform the identical test and share identical child nodes.

8. The computer-implemented method of claim 1, wherein the pattern matching system includes a Rete matching system, the network of decision nodes including a production rules system constructed according to the Rete matching system.

9. The computer-implemented method of claim 8, wherein the rules of the production rules system are implemented incrementally in the production rules system from a first level of child nodes to a last level of child nodes in the upstream direction.

10. A computing device configured for optimizing a network of decision nodes for a pattern matching system, comprising:
    one or more processors; and
    memory in electronic communication with the one or more processors, wherein the memory stores computer executable instructions that when executed by the one or more processors cause the one or more processors to perform the steps of:
    generating, by one or more computing devices each comprising at least one processor, an initial network of decision nodes constructed according to one or more rules, the decision nodes comprising one or more levels of parent nodes and child nodes, each level of child nodes being connected to respective parent nodes;

rearranging, by the one or more computing devices, one or more decision nodes of the initial network based at least in part on a conversion of the one or more rules to a disjunctive normal form;

analyzing, by the one or more computing devices, the rearranged network of decision nodes in an upstream direction, the upstream direction being in a direction from the child nodes to the parent nodes;

identifying a set of decision nodes based at least in part on analyzing the rearranged network, a first decision node of the set comprising a first parent node and a first child node and a second decision node of the set comprising a second parent node and a second child node, wherein the first parent node and the second parent node each perform a same test and the first child is identical to the second child node;

optimizing, by the one or more computing devices, the rearranged network by merging the set of decision nodes based at least in part on the analysis of the rearranged network and the identifying, wherein optimizing the rearranged network causes at least one child node of the first child node and the second child node to be connected upstream to at least two alpha parent nodes or at least two beta parent nodes at a decision level; and performing a security action based at least in part on the optimizing of the rearranged network.

11. The computing device of claim 10, wherein the network of decision nodes includes one or more node types, the one or more node types including at least one of a beta action node, a beta join node, an alpha test node, a beta memory node, and an alpha memory node, or any combination thereof.

12. The computing device of claim 11, wherein the at least one child node is connected upstream to two or more parent nodes of a same node type.

13. The computing device of claim 11, wherein the instructions executed by the one or more processors cause the one or more processors to perform the steps of:
identifying, from the analyzing, at least two beta action nodes that perform an identical action; and
merging the at least two beta action nodes that perform the identical action.

14. The computing device of claim 11, wherein the instructions executed by the one or more processors cause the one or more processors to perform the steps of:
identifying, from the analyzing, at least two beta join nodes that perform an identical join test, share identical child nodes, and share identical parent nodes, the identical parent nodes including either the same alpha memory parent nodes or the same beta join parent nodes; and
merging the at least two beta join nodes that perform the identical join test, share identical child nodes, and share identical parent nodes.

15. The computing device of claim 11, wherein the instructions executed by the one or more processors cause the one or more processors to perform the steps of:

identifying, from the analyzing, at least two beta memories or at least two alpha memories that share identical child nodes; and
merging the at least two beta memories or the at least two alpha memories that share identical child nodes.

16. The computing device of claim 11, wherein the instructions executed by the one or more processors cause the one or more processors to perform the steps of:
identifying, from the analyzing, at least two alpha test nodes that perform an identical test and share identical child nodes; and
merging the at least two alpha test nodes that perform the identical test and share identical child nodes.

17. A non-transitory computer-readable storage medium storing computer executable instructions for optimizing a network of decision nodes for a pattern matching system that when executed by one or more processors cause the one or more processors to perform the steps of:

generating, by one or more computing devices each comprising at least one processor, an initial network of decision nodes constructed according to one or more rules, the decision nodes comprising one or more levels of parent nodes and child nodes, each level of child nodes being connected to respective parent nodes;

rearranging, by the one or more computing devices, one or more decision nodes of the initial network based at least in part on a conversion of the one or more rules to a disjunctive normal form;

analyzing, by the one or more computing devices, the rearranged network of decision nodes in an upstream direction, the upstream direction being in a direction from the child nodes to the parent nodes;

identifying a set of decision nodes based at least in part on analyzing the rearranged network, a first decision node of the set comprising a first parent node and a first child node and a second decision node of the set comprising a second parent node and a second child node, wherein the first parent node and the second parent node each perform a same test and the first child is identical to the second child node;

optimizing, by the one or more computing devices, the rearranged network by merging the set of decision nodes based at least in part on the analysis of the rearranged network and the identifying, wherein optimizing the rearranged network causes at least one child node of the first child node and the second child node to be connected upstream to at least two alpha parent nodes or at least two beta parent nodes at a decision level; and performing a security action based at least in part on the optimizing of the rearranged network.

18. The non-transitory computer-readable storage medium of claim 17, wherein the network of decision nodes includes one or more node types, the one or more node types including at least one of a beta action node, a beta join node, an alpha test node, a beta memory node, and an alpha memory node, or any combination thereof.

* * * * *